(12) United States Patent
Glazebrook

(10) Patent No.: US 8,479,394 B2
(45) Date of Patent: Jul. 9, 2013

(54) ASSEMBLY OF AIRCRAFT COMPONENTS

(75) Inventor: Christopher John Glazebrook, Rutland (GB)

(73) Assignee: Airbus Operations Limited, Bristol (GB)

( * ) Notice: Subject to any disclaimer, the term of this patent is extended or adjusted under 35 U.S.C. 154(b) by 1146 days.

(21) Appl. No.: 12/065,665

(22) PCT Filed: Sep. 21, 2006

(86) PCT No.: PCT/GB2006/003523
§ 371 (c)(1),
(2), (4) Date: Mar. 4, 2008

(87) PCT Pub. No.: WO2007/034197
PCT Pub. Date: Mar. 29, 2007

(65) Prior Publication Data
US 2008/0256788 A1    Oct. 23, 2008

(30) Foreign Application Priority Data
Sep. 22, 2005  (GB) .................................... 0519364.4

(51) Int. Cl.
*B23P 19/10*    (2006.01)
*B64F 5/00*    (2006.01)

(52) U.S. Cl.
USPC .......... 29/897.2; 428/571; 382/190; 382/203; 382/152

(58) Field of Classification Search
USPC .................. 428/571; 29/897.2; 382/190–191, 382/203, 152
See application file for complete search history.

(56) References Cited

U.S. PATENT DOCUMENTS

| 1,046,323 | A |   | 12/1912 | Neighbour |
| 3,939,976 | A | * | 2/1976 | VanIseghem, Jr. ............. 206/390 |
| 3,978,529 | A | * | 9/1976 | Krafft .............................. 4/663 |
| 3,996,717 | A | * | 12/1976 | Sallenave et al. .......... 52/742.16 |

(Continued)

FOREIGN PATENT DOCUMENTS

| EP | 0290809 A2 | 11/1988 |
| EP | 0900726 A1 | 3/1999 |

(Continued)

OTHER PUBLICATIONS

ISR for PCT/GB2006/003523 mailed Feb. 23, 2007.

(Continued)

*Primary Examiner* — Peter DungBa Vo
*Assistant Examiner* — Kaying Kue
(74) *Attorney, Agent, or Firm* — Lowe Hauptman Ham & Berner, LLP

(57) ABSTRACT

A method of assembling parts to form an aircraft component, in which a first surface of a first part (for example a wing skin) is to be positioned in the assembly adjacent to a second surface of a second part (for example a rib foot). The method comprises the steps of taking measurements of the first part, taking measurements of the second part with a laser, and calculating the size and shape of the space that will be generated when the first and second parts are assembled. A shim of varying thickness in dependence upon the results of the calculating step is manufactured, for example by stereolithography, and the first and second parts are assembled with the shim positioned between the first and second parts, the varying thickness of the shim compensating for a varying spacing of the first and second surfaces.

16 Claims, 2 Drawing Sheets

U.S. PATENT DOCUMENTS

| | | | |
|---|---|---|---|
| 4,199,893 A * | 4/1980 | Rittinger | 446/429 |
| 4,209,937 A * | 7/1980 | Witte | 446/63 |
| 4,223,432 A * | 9/1980 | Carr | 29/417 |
| 4,336,879 A * | 6/1982 | Carr | 206/323 |
| 4,526,641 A | 7/1985 | Schriever et al. | |
| 4,690,413 A | 9/1987 | Adkins | |
| 4,848,137 A * | 7/1989 | Turner et al. | 73/1.81 |
| 4,863,033 A * | 9/1989 | Buj | 206/541 |
| 4,930,637 A * | 6/1990 | DeRoseau | 206/541 |
| 4,980,005 A | 12/1990 | Scollard | |
| 4,992,024 A * | 2/1991 | Heydrich | 415/229 |
| 5,209,093 A * | 5/1993 | Cadwell | 72/62 |
| 5,222,622 A * | 6/1993 | Laske, Jr. | 220/574.1 |
| 5,326,301 A * | 7/1994 | Woodside | 446/176 |
| 5,385,050 A | 1/1995 | Roberts | |
| 5,433,455 A | 7/1995 | Nelson | |
| 5,853,838 A * | 12/1998 | Siems et al. | 428/43 |
| 5,938,066 A * | 8/1999 | DeMars | 220/574.1 |
| 6,106,221 A | 8/2000 | Manuszak et al. | |
| 6,155,004 A * | 12/2000 | Earhart et al. | 52/98 |
| 6,234,858 B1 | 5/2001 | Nix | 446/97 |
| 6,475,052 B1 * | 11/2002 | Liu | 446/88 |
| 6,618,505 B2 * | 9/2003 | Cork et al. | 382/190 |
| 6,773,321 B1 * | 8/2004 | Urquiaga | 446/454 |
| 6,878,031 B2 | 4/2005 | Romyn | 446/93 |
| 6,918,627 B2 * | 7/2005 | Mataja et al. | 296/177 |
| 7,223,152 B2 * | 5/2007 | Anderson | 446/487 |
| 7,536,747 B2 * | 5/2009 | Christeson et al. | 16/247 |
| 7,730,789 B2 * | 6/2010 | Odendahl | 73/780 |
| 7,802,344 B2 * | 9/2010 | Watts | 16/247 |
| 7,803,030 B2 * | 9/2010 | Nagaoka | 446/93 |
| 7,975,377 B2 * | 7/2011 | Kwon | 29/830 |
| 2001/0046323 A1 * | 11/2001 | Cork et al. | 382/203 |
| 2002/0036246 A1 * | 3/2002 | Togashi et al. | 241/101.74 |
| 2003/0073377 A1 * | 4/2003 | Mataja et al. | 446/469 |
| 2003/0143919 A1 * | 7/2003 | Kaneko et al. | 446/269 |
| 2004/0069731 A1 | 4/2004 | Hovik | |
| 2004/0198138 A1 * | 10/2004 | Vasic et al. | 446/71 |
| 2004/0236454 A1 | 11/2004 | Weisser | |
| 2005/0173894 A1 * | 8/2005 | Shapiro | 280/643 |
| 2006/0137140 A1 * | 6/2006 | Christeson et al. | 16/247 |
| 2006/0205317 A1 * | 9/2006 | Benassi | 446/95 |
| 2008/0110275 A1 * | 5/2008 | Odendahl | 73/780 |
| 2008/0205763 A1 * | 8/2008 | Marsh et al. | 382/190 |
| 2008/0308211 A1 * | 12/2008 | Crumpler et al. | 156/70 |
| 2011/0028061 A1 * | 2/2011 | Sanderson et al. | 442/205 |

FOREIGN PATENT DOCUMENTS

| | | |
|---|---|---|
| EP | 1284224 A1 | 2/2003 |
| EP | 1396298 A3 | 3/2004 |
| EP | 1473142 A1 | 11/2004 |
| GB | 1351084 | 4/1974 |
| JP | 06307159 A | 11/1994 |
| JP | 2004-520209 A | 7/2004 |
| JP | 2004-325143 A | 11/2004 |
| JP | 200526127 A | 1/2005 |
| RU | 2009084 | 3/1994 |
| RU | 2257282 | 7/2005 |
| WO | 01/14208 A1 | 3/2001 |
| WO | 0166414 A1 | 9/2001 |

OTHER PUBLICATIONS

GB Search Report for GB0519364.4 dated Jan. 17, 2006.
GB Search Report for GB0519364.4 dated Aug. 11, 2006.

* cited by examiner

ASSEMBLY OF AIRCRAFT COMPONENTS

RELATED APPLICATIONS

The present application is based on International Application Number PCT/GB2006/003523 filed Sep. 21, 2006, and claims priority from British Application Number 0519364.4 filed Sep. 22, 2005, the disclosures of which are hereby incorporated by reference herein in their entirety.

BACKGROUND OF THE INVENTION

This invention relates to a method of assembling parts to form an aircraft component and more particularly to a method that involves the use of shims. The invention also relates to an aircraft component assembled by such a method and to an assembly of shims.

The assembly of aircraft components, and especially larger components, presents various challenges. In particular the assembly may have to be carried out to very narrow tolerances but also at reasonable speed and as economically as possible. An example where such issues arise is in the assembly of a wing skin to rib feet to form a wing-box of an aircraft. In a conventional process, the wing skin is manufactured in a desired shape and is then brought into position against the sub components (rib and spars, for example) of the underlying structure of the wing box to which the wing skin is to be secured. That underlying structure has outwardly projecting rib feet on which respective parts of the inner surface of the wing skin are required to rest so that fasteners can be inserted through the wing skin and the rib feet to secure them together. The external profile of the wing skin is important in terms of the aerodynamic performance of the aircraft and a strong connection between the wing skin and the rib feet is also important in terms of the structural strength of the wing-box.

Some tolerances have to be allowed for during manufacture and consequently when the wing skin is brought in an unstressed state into position against the rib feet, it is commonly found that, whilst some rib feet are in contact with the wing skin, others are spaced from it. To eliminate the spacings, there are two approaches that are adopted. A first approach is simply to deform the wing skin by the small amount necessary to bring the other rib feet into contact with the wing skin. An approach of that kind, however, results in a distortion of the external profile of the wing skin, which may adversely affect the aerodynamic performance of the wing, and in the introduction of additional internal stresses into the wing-box, which may adversely affect the structural strength of the wing. To avoid such problems, a second approach involving altering the dimensions of the underlying structure or the wing skin may be adopted. There are various ways in which that may be done, including fettling the rib feet, adding material to the wing skin or applying a liquid shim to the rib feet but all such methods have serious disadvantages and a preferred method is therefore to make use of solid shims in the manner described below.

In the method using solid shims, the wing skin and the underlying structure of the wing-box are brought into position next to each other and gaps between the rib feet and the inner surface of the wing skin are measured. Shims are then made to fill the gaps, the shape and size of each shim being chosen according to the shape and size of the gap to be filled. In this second approach the final assembly of the wing skin and the underlying structure of the wing-box has to be deferred until after the shims have been manufactured and at that later stage, the wing skin and the underlying structure have to once again be brought into position next to each other.

A process of this kind is expensive both because it requires the wing skin and the underlying structure of the wing-box to be brought into position relative to one another on two separate occasions and because it introduces a delay in the manufacturing process. Typically each of the wing skin and underlying structure are mounted on expensive jigs and they remain on those jigs throughout the steps described above. Care also has to be taken to ensure that a shim that has been manufactured to a particular size and shape to suit one particular gap is used to fill that gap and not inadvertently used to fill a different gap. Also the shims need to be handled carefully from the time of their manufacture, which may be at a remote location, until the time of their use.

It is an object of the invention to provide a method of assembling parts to form an aircraft component that involves the use of shims and that overcomes or mitigates at least some of the problems described above.

SUMMARY OF THE INVENTION

According to the invention there is provided a method of assembling parts to form an aircraft component, in which a first surface of a first part is to be positioned in the assembly adjacent to a second surface of a second part, the method comprising the steps of:

taking measurements of the first part while it is remote from the second part, taking measurements of the second part while it is remote from the first part, calculating from the measurements the size and shape of the space that will be generated between the first and second surfaces when the first and second parts are assembled, providing a shim of a thickness selected in dependence upon the results of the calculating step, and assembling the first and second parts with the shim positioned between the first and second parts.

By adopting the method described above it becomes possible to predict the sizes of the gaps that will be created between the first and second surfaces, before those surfaces are brought into position next to one another. Accordingly the prediction can be made as soon as the parts have been manufactured and the surfaces need only be brought into position next to one another after manufacture of the shim, at which stage the assembly of the parts can be effected. Thus there is no need for the parts to be brought into position twice, as in the case of the solid shimming method described above; rather the first and second parts can be assembled together only once in the entire assembly process.

The measurements of the first part are preferably taken while it is mounted on a jig. The first part preferably remains mounted on the jig until the first and second parts are assembled. There can then be no opportunity for the part to change its size or shape between being measured and being assembled. It is within the scope of the invention to make a measurement of a portion of the first part from which the measurement of another portion can be deduced, for example, by assuming in the case of a wing skin a certain thickness of skin; similarly it is, for example, possible in a case where a wing skin is formed in a mould, to make measurements on the wing skin while it is in the mould and then make an allowance for an anticipated change in shape of the wing skin upon its release from the mould. It is preferred, however, that the measurements taken of the first part comprise measurements of the first surface to provide a direct indication of the shape and position of the first surface.

Measurements can be taken using any of a variety of techniques. For example, the measurements may be taken by a hand held metrology unit; in such a case, the hand held unit may calculate the position and orientation of the unit relative to a fixed base unit. Another possibility is that the measurements are taken by a metrology unit mounted on a support; in that case the position of the metrology unit may be known either completely or partly; the metrology unit may be moved on the support as the measurements are taken. For example, the unit may be mounted on a support that fixes the orientation of the unit and its position in two orthogonal directions but allows movement of the unit in the remaining third orthogonal direction while taking measurements of the first part, that movement of the unit being measured.

The taking of measurements of the first part preferably comprises measuring positions relative to a reference point on the jig on which the first part is mounted. In that case, when the jig is brought into a known position, the location of the first part is known. The reference point on the jig is preferably an engagable part suitable for engagement with a corresponding part on another jig. The engageable part is preferably a ball or a part of a ball and the corresponding part is preferably a socket or vice versa. The interengaging surfaces of the ball and socket are preferably part-spherical.

The features described above with reference to the first part may also be applied to the second part. For example, the measurements of the second part are preferably taken while it is mounted on a jig. If the jig on which the first part is mounted has an engageable part comprising a ball, then the jig on which the second part is mounted preferably has an engageable part comprising a socket.

While it is within the scope of the invention to provide a library of shims of varying dimensions so that the step of providing a shim comprises selecting a shim from the library, it is preferred that the shim is manufactured to the required dimensions in response to the calculating step.

Preferably the shim is of varying thickness. While it is possible for the shim to be provided with one face flat and only the opposite face of varying profile to vary the thickness of the shim, it is generally preferred that the varying thicknesses of the shim results from a varying profile of each of the opposite faces of the shim.

Shims can be manufactured by a wide variety of processes and made from various materials. For example, a shim may be made by machining away material from a block which is initially of a generally thin cuboidal shape. It is, however, preferred that when the shim is first formed it is made to substantially its desired thickness. More particularly, the shim is preferably formed by an additive manufacturing process. In such processes a product is built up into substantially its final form by adding material in a multiplicity of steps at positions chosen according to the desired shape of the product. Such manufacturing processes are known per se. In one suitable process, the shim is formed by solidifying a photosensitive material by irradiating the material; such a process may be used to manufacture a shim made of a plastics material. In another suitable process the shim is formed by sintering a fusible powder; such a process may be used to form a shim made of metal.

Preferably, the shim is labelled to indicate its position when the first and second parts are assembled. The label may be applied to the shim after manufacture and may for example be an adhesive label, but it is also possible to create the label as an integral part of the shim during its manufacture. The label may include a bar code containing some or all of the required information.

In the description above reference is made to a surface of each of the first and second parts, but it should be understood that in many applications of the invention a multiplicity of surfaces (a multiplicity being more than three and often more than five) are positioned in the assembly adjacent to one another when the first and second parts are assembled and a respective shim is manufactured and positioned between each of the adjacent surfaces. A good example of such a case is where a multiplicity of rib feet are to be secured to a wing skin.

For a single assembly of a first part to a second part a substantial number of shims may be required. Advantageously, the shims are manufactured in one or more shim assemblies, each shim assembly comprising a frame and a multiplicity of shims detachably connected in the frame. This facilitates correct handling of the shims and can reduce the likelihood of loss of or damage to the shims. Preferably, the frame and the multiplicity of shims detachably connected in the frame are formed in one piece, with breakable portions connecting the shims to the frame.

Such an assembly of shims can readily be made by an additive manufacturing process as described above. The shims will usually be generally lamellar and are preferably connected in the frame substantially parallel to one another. They may be stacked in tiers within the frame. Each tier may comprise only one shim or more than one shim. Preferably shims in adjacent tiers are spaced apart from one another; that reduces the risk of damage to one shim through accidental contact with another one. Preferably the assembly is generally in the shape of a cuboid whose sides are defined by parts of the frame, the shims being contained within the cuboid and surrounded on all sides by the frame. Each shim in the stack preferably has its own profile providing a required variation in thickness. Since each shim is sized to fill a particular gap, the thickness profiles of the shims in the assembly will usually differ from one another. In some cases, two or more shims in the same assembly may have the same thickness profile, but in other cases all the shims in an assembly will have different thickness profiles.

The step of assembling the first and second parts preferably further comprises applying a layer of sealant between the shim and the first part and/or between the shim and the second part. The step may additionally or alternatively further comprise arranging a sealing member, for example, an O-ring between the shim and the first part and/or between the shim and the second part.

Whilst it is within the scope of the invention to assemble the first and second parts with the shim, without any additional fastening, it will usually be desirable to have such further fastening. Accordingly, the step of assembling the first and second parts preferably further comprises passing one or more fasteners through the shim and the first or second parts to thereby secure the first and second parts together with the shim therebetween. In order to allow the passage of the one or more fasteners, the first part, second part and/or the shim may be formed at the stage of initial manufacture or subsequently, for example, by drilling, with aligned holes therethrough.

In order to further facilitate the assembly process, the method may also include a pre-assembly step of temporarily securing the shim to one of the first and second parts. A clip may be used for this purpose. The clip may be manufactured as a separate component or a formation serving a similar purpose may be formed as an integral part of the shim and may comprise a lip on one or more edges of the shim. The lip may be a few millimeters deep.

The materials of the first and second parts may be of a wide variety of kinds. Commonly they are of metal but they may also be of other materials including composite materials. Indeed the invention can be of special advantage where the first and/or the second part are formed of a composite material because such a material is relatively stiff making any deformation of the material from its natural shape especially undesirable. At the same time manufacturing parts from composite materials to very tight tolerances can be very expensive or even impossible.

The invention can be applied to various aircraft components, including fuselages, but it is of particular advantage in wing design. For example, the first part may be a rib (or a rib having a multiplicity of rib feet); the aircraft component may be a wing-box; and the second part may be a wing skin.

In another aspect, the present invention provides a method of assembling parts to form an aircraft component, in which a first surface of a first part is to be positioned in the assembly adjacent to a second surface of a second part, the method comprising the steps of assembling the first and second parts with a shim positioned between the parts, the shim having a thickness determined in dependence upon a prior measurement of the first part and a prior measurement of the second part, wherein the first and second parts are brought together only once in the entire assembly of the aircraft component.

In a further aspect the present invention provides a method of assembling parts to form an aircraft component, in which a first surface of a first part is to be positioned in the assembly adjacent to a second surface of a second part, the method comprising the steps of assembling the first and second parts with a shim positioned between the parts, the shim having a thickness determined in dependence upon a prior measurement of the first part while remote from the second part and a prior measurement of the second part while remote from the first part.

The present invention also provides an aircraft component that has been assembled by a method as defined above and an aircraft including such a component. The invention is of particular application to larger components and/or to larger aircraft. The aircraft is preferably of a size equivalent to an aircraft designed to carry more than 75 passengers, and more preferably more than 150 passengers.

The use of an assembly of shims as described above is especially advantageous in the assembly of parts by a method as defined above but is also of value in other applications. Accordingly in a second form of the invention there is provided an assembly of shims comprising a frame and a multiplicity of shims detachably connected in the frame. The assembly may take any of the forms described above.

DESCRIPTION OF THE DRAWINGS

By way of example, a method of assembling a wing skin onto rib feet will now be described with reference to the accompanying drawings, of which.

DETAILED DESCRIPTION

The method of assembly that will now be described forms part of a method of manufacturing a wing-box. In overview, the manufacturing method comprises the following steps:
a) manufacture spars for the wing-box,
b) mount the spars on a first jig,
c) manufacture ribs for the wing-box,
d) mount the ribs on the first jig,
e) manufacture wing skins for the wing-box
f) mount the wing skins on second and third jigs,
g) take measurements of the positions of the rib feet of each rib and store the results,
h) take measurements of the surface of each wing skin that is to be assembled next to the rib feet and store the results,
i) from the measurements in (g) and (h), calculate appropriate profiles for the shims,
j) manufacture shims of desired profiles,
k) apply sealant to the rib feet and place the shims on the rib feet,
l) apply sealant to the shims,
m) bring together the wing skins and the ribs, and
n) secure fasteners through the wing skins and the ribs.

The steps above will now be described in further detail with particular reference to those steps that are not carried out in conventional methods of manufacturing wing-boxes.

Steps (a) to (d)

Figure 1:
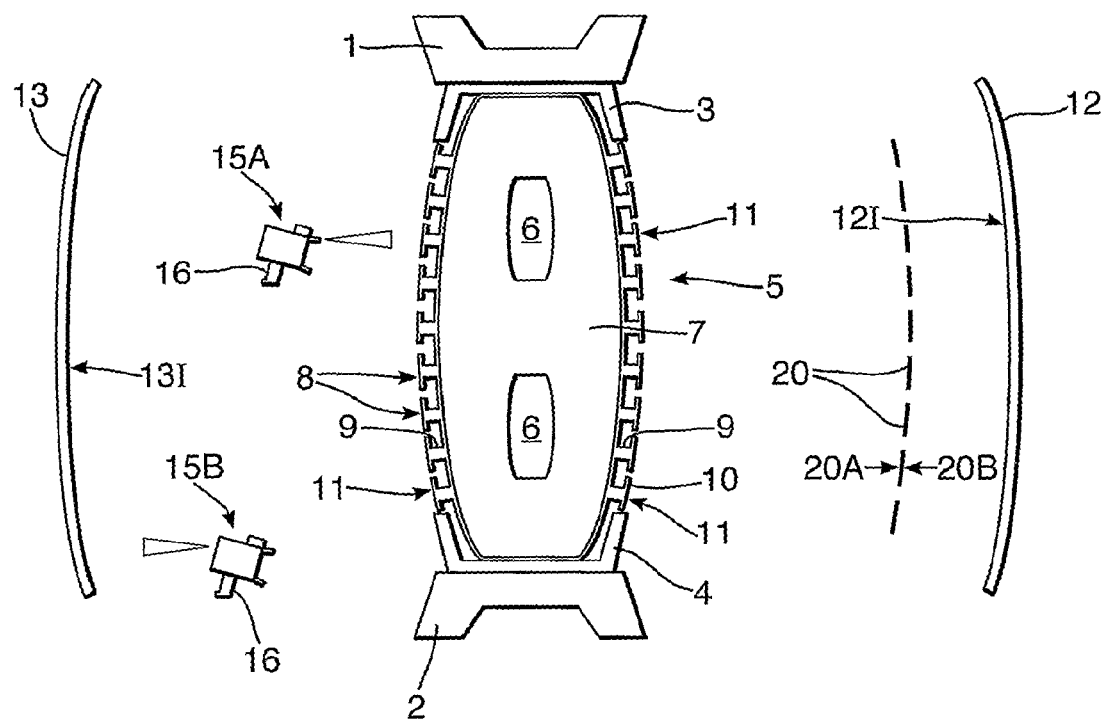
FIG. 1 is a schematic view illustrating certain steps carried out in the method.

The manufacture of the spars, the ribs and the wing skin is carried out in the normal way. As is standard practice, the spars of a wing are mounted on the first jig and the ribs, once manufactured are fitted to the first jig in their required positions. FIG. 1 shows schematically a first jig having parts 1 and 2, spars 3 and 4 mounted in the jig and a rib 5 mounted in the jig and extending between spars 3 and 4. It will be understood that the rib 5 is one of many ribs disposed in generally parallel planes along the wing-box. The rib 5 shown in FIG. 1 has a pair of apertures 6 through a central portion 7 of the rib and carries feet 8 on each of its opposite sides. Each of the feet 8 has a connecting portion 9 connected to the central portion 7 of the rib and a foot portion 10 with an outwardly projecting face 11 next to which a portion of a confronting face of a wing skin is to be placed.

Steps (e) and (f)

The manufacture of the wing skins is also carried out in the normal way. One wing skin is required for each of the opposite sides of the wing-box, the sides being the top and bottom faces of the wing of the final aircraft. In FIG. 1 a first wing skin 12 is shown to one side of the rib 5 and a second wing skin 13 is shown to the opposite side. The wing skin 12 has an inner face 121 which is shaped to match the locations of the faces 11 of the rib feet on the right hand side of the rib 5 (as seen in FIG. 1) and the locations of the other similar feet (not shown) on other ribs. Similarly the wing skin 13 has an inner face 131 which is shaped to match the locations of the feet 11 on the left hand side of the rib 5 (as seen in FIG. 1) and the locations of the other similar feet (not shown) on other ribs. Whilst reference is made immediately above to shaping the wing skin surfaces 121 and 131 to match the locations of the rib feet, it should be understood that the wing skin surfaces 121 and 131 may be chosen first and then the locations of the feet 11 selected to match the shapes of those surfaces.

Figure 2:
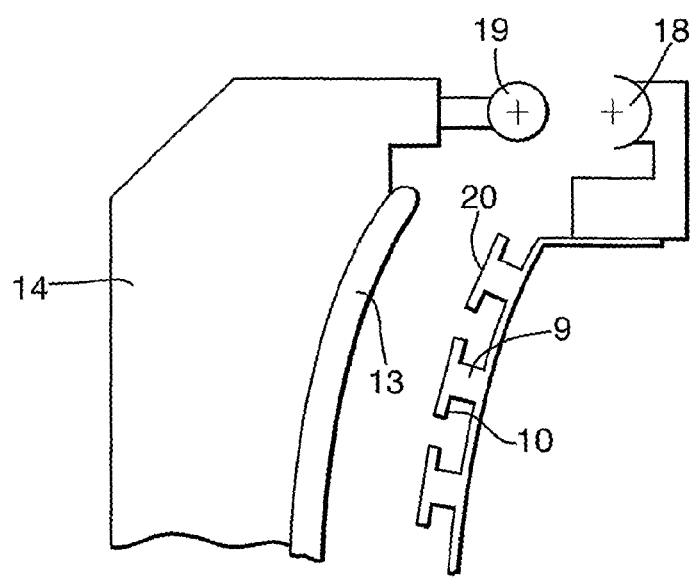
FIG. 2 is a schematic end view illustrating a particular feature of the method.

Once the wing skins 12 and 13 have been manufactured they are placed in respective jigs, referred to herein as second and third jigs. In FIG. 2 the wing skin 13 can be seen mounted on a jig 14.

Steps (g) and (h)

The next step in the method represents a first departure from the known assembly method that has already been referred to. In the known assembly method, each wing skin would be brought into position next to its rib feet and gaps formed between the shims and the rib feet measured, so that shims of an appropriate size and shape could be provided. In the method according to the invention and described herein, the wing skins and the rib feet remain remote from one another while measurements of them are taken. In FIG. 1, the measuring steps are indicated schematically by the presence of hand held laser scanning tools 15A, 15B, each having a hand grip 16. It will be seen that the tool 15A is shown scanning the rib feet on one side of the wing-box and that the tool 15B is shown scanning the wing skin 13. Although for the convenience of illustration the wing skin 13 is shown relatively close to the rib feet 8, it should be understood that in practice they can be at locations very remote from one another. Indeed, it is even possible for the measurement of the wing skin to be carried out in a different country from that of the rib feet.

Measuring tools suitable for making the measurements are already known per se and are not described in detail herein. One example of a suitable measuring tool is a Leica T-Scan high-speed hand scanner sold by Leica Geosystems AG. With such a tool it is possible to obtain in digital format a very accurate measurement of the profiles of the wing skin surfaces 121 and 131 and of the outwardly projecting faces 11 of the rib feet 8. In each case the measurements include scanning of a reference feature on the jigs: as shown in FIG. 2 the first jig on which the rib feet are mounted has a hemi-spherical socket 18 which is able to receive as an exact fit a spherical ball 19 on the jig carrying the wing skin 13. Although only one ball 19 and socket 18 are visible in FIG. 2 it will be understood that a number of such ball and socket reference features are desirably provided. When at a later stage the jigs are assembled together, the engagement of the balls 19 in the sockets 18 ensure the correct juxtaposition of the wing skins to the rib feet.

Step (i)

Having once obtained the metrology data from the measurements it becomes a straightforward computer processing task to calculate, using appropriate metrology software, the appropriate dimensions for each shim to be placed on a rib foot. Shims 20 are shown in FIG. 1 on one side only of the wing-box, but of course similar shims are also provided on the other side. Each shim 20 has opposed faces 20A and 20B, which are individually profiled. The face 20A is profiled to match the measured profile of the rib face 11 of its respective rib foot and the face 20B is profiled to match the measured profile of the inner surface 121 of the wing skin 12. The thickness of each shim is calculated in order to fill the calculated gap between the respective rib foot and the wing skin, with a suitable allowance made for sealant layers (see steps (k) and (l) below). In a particular example of the invention a typical average thickness of a shim is a few mm.

Step (j)

Once the dimensions of each shim have been calculated, the shims are manufactured. Manufacture of the shims can be at a location remote from the site of the wing skins 12, 13 or the ribs 5 and the necessary data generated from step (i) may be sent electronically. In the particular example of the invention described, the shims are manufactured by an additive manufacturing method comprising stereolithography in which a layer of liquid photosensitive resin is subjected to irradiation by a laser in selected regions of the layer; the laser light causes the resin to cure, but only in those regions exposed to the light. A further layer of liquid resin is then added and the process repeated with a new set of regions exposed to the laser light and therefore cured. In that way, a three dimensional shape can be built up.

Figure 3:
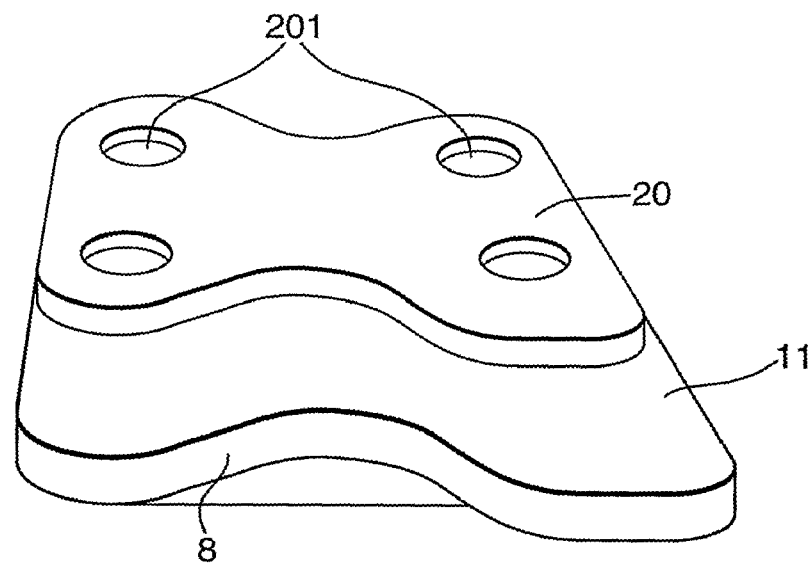
FIG. 3 is a perspective view of a shim resting on a rib foot.

FIG. 3 shows a shim 20 that may be manufactured by the process just described. In the drawing the shim 20 is shown resting on a rib foot 8 having an outwardly projecting face 11. In FIG. 3 the shim 20 is shown only partly over the face 11 simply for the sake of clarity of illustration. In practice, the shim 20 will have an outline matching that of the face 11 and the outlines will be aligned. As can be seen in FIG. 3 the profile of the confronting faces of the shim 20 and the rib foot 8 are a precise match. Also the shim 20 is formed with four circular shallow recesses 201, the purpose of which is described later.

Figure 4:
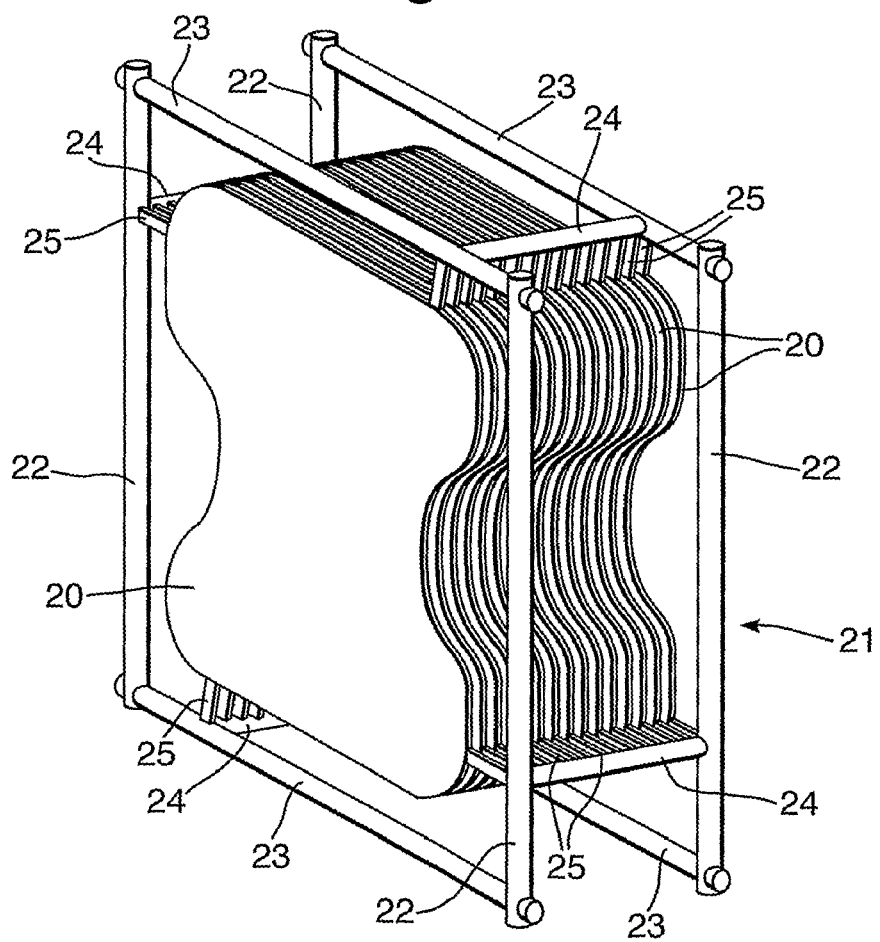
FIG. 4 is a perspective view of an assembly of shims.

Whilst it is possible for the shims to be manufactured individually, it is more productive to manufacture them in groups. FIG. 4 shows form of assembly of shims 20 that may be manufactured. The shims 20 are shown contained within a frame 21 which is of generally cuboidal shape and generally comprises four upright members 22, four horizontal members 23 and four cross members 24. The shims 20 are arranged in tiers to form a stack, with each shim 20 in the example illustrated connected to the members 23, 24 by connecting rods 25 and forming one tier of the stack. As shown in FIG. 4, the shims 20 are thereby connected in the frame 21, one beside another, with a space between each shim. The entire assembly shown in FIG. 4 is manufactured in one piece by the additive manufacturing method described above; whilst it is possible for the assembly to be made in other orientations, it is preferred to make it with the members 23 horizontal and the members 22 vertical so that the shims 20 are in vertical planes. During the manufacturing process the portions of the connecting rods 25 that join onto the shims 20 are made narrower than the other parts of the rods 25, so that they can be broken relatively easily to allow a shim to be removed from the assembly.

In an alternative to the assembly shown in FIG. 4, a pair of shims is contained in each layer of the stack. It will be understood that many other arrangements of shims in the assembly may be adopted if desired.

As will now be understood, although the shims will all have exactly the same or very similar outlines, the profiles of the opposite faces of the shims will be different with the profiles on each shim being determined according to the shape and size of the gap that it has been calculated will exist between a respective rib foot and the wing skin. Each shim is therefore labelled to indicate the particular rib foot on which it is to be placed and the orientation of the shim on the foot is also shown by the labelling. In this particular example the labelling comprises a detachable label attached to each shim.

The jig mounting the spars 3, 4 and the ribs 5, and the jigs mounting the wing skins 12, 13 are then brought to a common location, together with the shims 20, so that the wing skins can be assembled on the ribs. A layer of sealant is first applied to the outer face 11 of each rib foot 8 and the appropriate shim 20 then placed over the rib foot 8. As already described with reference to FIG. 3, where a shim 20 is shown partly over a face 11 of a rib foot, the outline of the shim 20 is sized and shaped to match the outline of the rib foot 8 and the face 20A of the shim 20 that confronts the outer face 11 of the rib foot 8 is profiled to match exactly the profile of the face 11.

A layer of sealant is then applied to the outer face 20B of each of the shims 20 on one side of the wing-box and the jig mounting the wing skin to be assembled on that side of the wing-box is for the first (and only) time brought into position adjacent to the jig mounting the wing-box. The spherical balls 19 are engaged in the hemi-spherical sockets 18 and, with that precise positioning of the wing skin relative to the rib feet, the wing skin makes contact with the layers of sealant on the outer faces 20B of the shims 20. Four fasteners are then passed through each of the shims 20 with each fastener passing though a hole drilled centrally in a respective recess 201 (FIG. 3) of the shim. The recess 201 is of greater diameter than the fastener and therefore defines a groove around the fastener, the layer of sealant being deeper in the vicinity of each fastener and therefore facilitating the maintenance of a seal around the fastener.

Once all the fasteners have been fastened, the procedure just described for one wing skin is repeated for the other wing skin. The assembly of the wing skins to the rib feet is then complete. The assembled wing-box is subsequently removed from the jigs.

By adopting a method as described above it is possible to have a very precise fit between the wing skins and the ribs. For example a tolerance of 0.2 mm can readily be achieved.

While particular embodiments of the invention have been described above with reference to the drawings, it will be understood that many modifications may be made to those embodiments. Two examples of such modifications are mentioned below, but it will be understood that other modifications may be made.

In the embodiments described the measurement data is obtained using a hand-held laser scanner. Other measuring devices may alternatively be used including scanners mounted for movement on fixed axes and scanners mounted on robot arms.

The shims 20 are described as being manufactured by a stereolithographic process involving irradiation of a layer of liquid photosensitive resin by laser light. An alternative method involves laser sintering of a layer of heat fusible powder. Instead of dispensing a layer of material, it is also possible to dispense a thin bead of material through a nozzle and, by controlling its movement in three dimensions, build up a desired shape. Also more traditional methods such as CNC milling of a blank may be employed.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. A method of assembling parts to form an aircraft component, in which a first surface of a first part is to be positioned in the assembly adjacent to a second surface of a second part, the method comprising the steps of:
    taking measurements of the first part while it is remote from the second part,
    taking measurements of the second part while it is remote from the first part,
    calculating from the measurements the size and shape of the space that will be generated between the first and second surfaces when the first and second parts are assembled,
    providing a shim of varying thickness in dependence upon the results of the calculating step, and
    assembling the first and second parts with the shim positioned between the first and second parts, the varying thickness of the shim compensating for a varying spacing of the first and second surfaces, wherein the measurements of the first part are taken while it is mounted on a first jig, and the measurements of the second part are taken while it is mounted on a second jig, the taking of measurements of the first part comprising measuring positions relative to a reference point on the first jig, and the taking of measurements of the second part comprising measuring positions relative to a reference point on the second jig.

2. A method according to claim 1, in which the varying thicknesses of the shim results from a varying profile of each of the opposite faces of the shim.

3. A method according to claim 1, in which the shim is formed by an additive manufacturing process.

4. A method according to claim 1, in which a multiplicity of surfaces are positioned in the assembly adjacent to one another when the first and second parts are assembled and a respective shim is manufactured and positioned between each of the adjacent surfaces.

5. A method according to claim 4, in which the shims are manufactured in one or more shim assemblies, each shim assembly comprising a frame and a multiplicity of shims detachably connected in the frame.

6. A method according to claim 5, in which the frame and the multiplicity of shims detachably connected in the frame are formed in one piece, with breakable portions connecting the shims to the frame.

7. A method according to claim 1, in which the first part and/or the second part is formed of a composite material.

8. A method according to claim 1, in which the aircraft component is a wing-box.

9. A method of assembling parts to form an aircraft component, in which a first surface of a first part is to be positioned in the assembly adjacent to a second surface of a second part, the method comprising the steps of assembling the first and second parts with a shim positioned between the parts, the shim having a thickness determined in dependence upon a prior measurement of the first part and a prior measurement of the second part, wherein the first and second parts are brought together only once in the entire assembly of the aircraft component, wherein the prior measurements of the first part have been taken while it is mounted on a first jig, and the prior measurements of the second part have been taken while it is mounted on a second jig, the taking of measurements of the first part having comprised measuring positions relative to a reference point on the first jig, and the taking of measurements of the second part having comprised measuring positions relative to a reference point on the second jig.

10. A method of assembling parts to form an aircraft component, in which a first surface of a first part is to be positioned in the assembly adjacent to a second surface of a second part, the method comprising the steps of assembling the first and second parts with a shim positioned between the parts, the shim having a thickness determined in dependence upon a prior measurement of the first part while remote from the second part and a prior measurement of the second part while remote from the first part, wherein the prior measurements of the first part have been taken while it is mounted on a first jig, and the prior measurements of the second part have been taken while it is mounted on a second jig, the taking of measurements of the first part having comprised measuring positions relative to a reference point on the first jig, and the taking of measurements of the second part having comprised measuring positions relative to a reference point on the second jig.

11. A method according to claim 1, wherein the reference point on the first jig is an engageable part, suitable for engagement with a corresponding part on the second jig.

12. A method according to claim 11, wherein the engageable part comprises at least part of a ball and the corresponding part is a socket on the second jig.

13. A method according to claim 9, wherein the reference point on the first jig is an engageable part, suitable for engagement with a corresponding part on the second jig.

14. A method according to claim 13, wherein the engageable part comprises at least part of a ball and the corresponding part is a socket on the second jig.

15. A method according to claim 10, wherein the reference point on the first jig is an engageable part, suitable for engagement with a corresponding part on the second jig.

16. A method according to claim 15, wherein the engageable part comprises at least part of a ball and the corresponding part is a socket on the second jig.

\* \* \* \* \*